United States Patent [19]
Hemingway et al.

[11] Patent Number: 5,910,293
[45] Date of Patent: Jun. 8, 1999

[54] EXHAUST MANAGEMENT SYSTEM CONTROL

[75] Inventors: Mark David Hemingway, Columbiaville; Nicholas Alexander Pamphilis, Clarkston, both of Mich.

[73] Assignee: General Motors Corporation, Detroit, Mich.

[21] Appl. No.: 08/898,419

[22] Filed: Jul. 22, 1997

[51] Int. Cl.$^6$ ........................................... F01N 3/10
[52] U.S. Cl. ........................ 423/213.7; 423/213.2; 422/171; 422/177; 422/178; 422/108; 60/274; 60/295
[58] Field of Search ...................... 422/171, 177, 422/178, 172, 168–170, 107, 108, 110, 111; 60/276, 274, 282, 286, 289, 295, 297; 423/213.2, 213.5, 213.7

[56] References Cited

U.S. PATENT DOCUMENTS

| | | | |
|---|---|---|---|
| 5,447,694 | 9/1995 | Sawroop et al. | 422/171 |
| 5,510,086 | 4/1996 | Hemingway et al. | 422/171 |
| 5,587,137 | 12/1996 | Swaroop et al. | 423/239.2 |
| 5,662,869 | 9/1997 | Abe et al. | 422/171 |

*Primary Examiner*—Hien Tran
*Attorney, Agent, or Firm*—Anthony L. Simon

[57] ABSTRACT

An exhaust management control method comprising the steps of: immediately following a cold start of an engine, adsorbing hydrocarbons from engine exhaust into a hydrocarbon adsorber; determining when a catalytic converter catalyst light-off is obtained and thereafter purging the adsorber, wherein a first regeneration of the adsorber is obtained; detecting an engine off condition of the vehicle; and injecting air through the adsorber following the detected engine off condition while the adsorber is hot enough that coke deposits thereon are oxidized and thereby removed from the adsorber, wherein a second regeneration of the adsorber is achieved.

3 Claims, 2 Drawing Sheets

EXHAUST MANAGEMENT SYSTEM CONTROL

This invention relates to an exhaust management system control.

BACKGROUND OF THE INVENTION

Exhaust management control systems that use a hydrocarbon adsorber in connection with a conventional catalytic converter catalyst coated substrate have been proposed for use in vehicles with internal combustion engines. In general, the absorber is implemented to limit hydrocarbon emissions during and immediately following cold start operation of the vehicle engine. Cold start operation is engine start up when the engine (and the catalytic converter) are at temperatures below normal operating temperatures.

More particularly, when the vehicle engine is started, exhaust gases out of the engine travel through the exhaust manifold to a combination of a catalyst-coated substrate and an adsorber. The configuration of the catalytic converter substrate and the adsorber may vary and many different configurations are known. For example, the adsorber may be provided upstream of the catalytic converter substrate or between two catalytic converter substrates. In the first example, exhaust gases flowing out of the engine immediately after a cold start of the engine have their hydrocarbons removed by and stored in the adsorber. The exhaust gases then continue to the downstream catalytic converter and heat the converter to a light-off temperature, at which point the catalytic converter can provide conventional catalytic operation on the exhaust gases to reduce undesirable exhaust gas species to gas species more acceptable for vehicle tail pipe emissions. As the adsorber warms up, it begins to desorb the stored hydrocarbons, sending those hydrocarbons to the catalytic converter for conversion to the more desirable exhaust gases.

Ideally, the catalytic converter light-off occurs before significant desorption of the adsorber. In some examples, it may be beneficial to provide a second catalyst coated substrate upstream of the adsorber to ensure that light-off of the upstream catalytic converter catalyst coated substrate occurs before desorption from the adsorber. During desorption from the absorber, the engine operates in a lean mode or a supplemental air pump is used to pump supplemental air into the exhaust gas flow path upstream of the adsorber. The lean exhaust gas and/or supplemental air stimulate desorption of the hydrocarbons from the adsorber.

Another advantage of running the engine lean and/or providing supplemental air from an air pump during the desorption relates to deposits of carbon, also referred to as coke deposits, that tend to build up on the adsorber during operation of the engine soon after engine start up. The coke deposits may occur when the adsorber zeolite reaches a temperature of about 200 degrees C, where certain zeolites tend to polymerize or partially crystallize carbon in the exhaust hydrocarbons. A significant carbon-rich presence allowing the coke build-up occurs due to the fuel-rich engine operation that typically occurs during and immediately following engine start-up. Once the adsorber reaches a sufficiently high temperature, for example, 600 degrees C, the coke deposits are burned off of the adsorber by forcing fuel-lean exhaust or supplemental air into contact with the coke deposits. After a sufficient period of burn off and desorption, the engine is run in closed loop fuel control mode, where the engine exhaust is ideally maintained at about stoichiometric conditions. After the desorption, the adsorber is generally nonfunctional in managing the exhaust gases flowing out of the vehicle engine and its next operation occurs after the next cold start of the vehicle engine, after which the adsorber performs the steps of adsorbing the hydrocarbons, desorbing the hydrocarbons and having coke buildup removed therefrom.

SUMMARY OF THE INVENTION

It is an object of the present invention to provide an exhaust management system.

Advantageously, this invention provides an exhaust management system control for a system utilizing a hydrocarbon adsorber that increases the useful life of the hydrocarbon adsorber and increases the operating efficiency of the hydrocarbon adsorber. More particularly, this invention recognizes that certain vehicle operating conditions can cause premature reduction in efficiency of the hydrocarbon adsorber in the exhaust management system. This premature reduction in the operating efficiency of the hydrocarbon adsorber occurs because certain vehicle engine operating profiles can cause temporary conditions to occur that result in the formation of carbon or coke deposits on the hydrocarbon adsorber during vehicle operation, even after the adsorber has been purged and regenerated. These buildups of coke on the hydrocarbon adsorber, occurring after purge and regeneration of the adsorber, are therefore not removed during the purging or desorption process taught by the prior art. Instead, the coke remains on the adsorber, decreasing the efficiency of the adsorber during the next cold start of the vehicle engine.

According to this invention, it is recognized that known purge controls for adsorbers are insufficient to maintain optimal efficiency of the adsorber. This invention, therefore, adds additional purge or regeneration cycles for the adsorber to maintain high efficient adsorber operation. More particularly, this invention recognizes that by adding a regeneration cycle to the exhaust control system immediately after key-off of the vehicle, the system achieves effective regeneration of the adsorber by removing coke deposits thereon. That is, when the vehicle has keyed-off after operating in conditions in which the catalyst has reached light-off temperature and the adsorber therefore is also at a high temperature, a supplemental air pump is activated, pumping air into the exhaust management system upstream of the adsorber. The air flows through the adsorber and comes into contact with the hot coke deposits thereon which are oxidized by the air and carried out through the tail pipe. The pump is maintained activated for a time period sufficient to regenerate the adsorber, removing substantially all of the coke deposits thereon so that at the next start up of the vehicle the adsorber is again at high operating efficiency.

Advantageously then, according to a preferred example, this invention provides an exhaust management control method comprising the steps of: immediately following a cold start of an engine, adsorbing hydrocarbons from engine exhaust into a hydrocarbon adsorber; determining when a catalytic converter catalyst light-off is obtained and thereafter purging the adsorber, wherein a first regeneration of the adsorber is obtained; detecting an engine off condition of the vehicle; and injecting air through the adsorber following the detected engine off condition while the adsorber is hot enough that coke deposits thereon are oxidized and thereby removed from the adsorber, wherein a second regeneration of the adsorber is achieved.

BRIEF DESCRIPTION OF THE DRAWINGS

The present invention will now be described by way of example with reference to the following drawings in which.

DESCRIPTION OF THE PREFERRED EMBODIMENT

Figure 1:
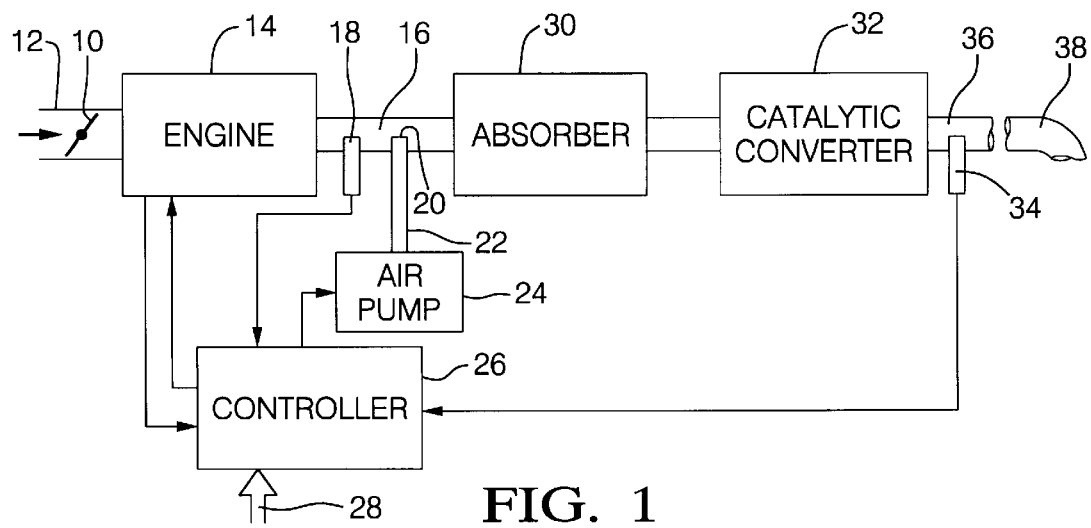
FIG. 1 illustrates a schematic of an example exhaust management system control according to this invention.

Referring now to FIG. 1, the system shown includes an engine 14 receiving intake air through intake ducts 12 for use in the internal combustion process within engine 14. Throttle 10 controls air flow into the engine 14 in a known manner responsive to demands by the vehicle operator through foot operation of the vehicle accelerator pedal (not shown). Controller 26 receives various measurement and control signals through the control lines shown and through bus 28, representing miscellaneous data of a type typically used by an engine controller, and provides control commands to the vehicle engine 14 controlling fueling of the vehicle engine and other operations known to those skilled in the engine control arts. In general the controller 26 includes a microprocessor, permanent memory for storing a control program and control variables, random access memory for storing variables used during operation of the microprocessor and input and output interface circuits of a known type for interfacing the various sensor signal outputs with the microprocessor and for converting microprocessor commands to signals useful for control of the engine and various actuators including air pump 24.

During operation of the engine 14, exhaust gases containing products of the combustion process within the engine 14 exit through exhaust gas passage 16, which may be the engine exhaust manifold or manifold pipe of a type known to those skilled in the art. The exhaust gases flow through passage 16 to the adsorber 30 and then to the conventional catalytic converter 32 containing a catalyst-coated substrate of a type known to those skilled in the art. The gases then flow through passage 36 and eventually make their way to the tail pipe 38 where they are emitted from the vehicle. The adsorber 30 typically contains a substrate of either ceramic or metal coated with a material that adsorbs hydrocarbons when cool and desorbs hydrocarbons when warm. One known class of adsorber coating materials is commonly referred as zeolites, a variety of which are well known to those skilled in the art.

Exhaust oxygen sensors 18 and 34 provide exhaust oxygen sensor signals to the controller 26, which uses the signals in a known manner to provide data for closed loop fuel control operation of the engine 14 and for diagnosis of the operation of the catalytic converter 32. An air pump 24 is provided and is operated in response to signals from controller 26 to provide secondary air, pumped from the engine air intake or from the outside atmosphere, through tube 22 and out outlet 20 within passage 16, upstream of the adsorber 30.

The configuration of the adsorber 30 and catalytic converter 32 shown is an example configuration. Other configurations for adsorbers and catalytic converters are known, including a configuration in which a first catalytic converter substrate is placed upstream of the adsorber and a second is placed downstream of the adsorber. Other known configurations include bypass valves for bypassing the adsorber when the adsorber is not being used by the system. Any such known configurations may be substituted for the configuration shown and used with this invention.

Figure 2:
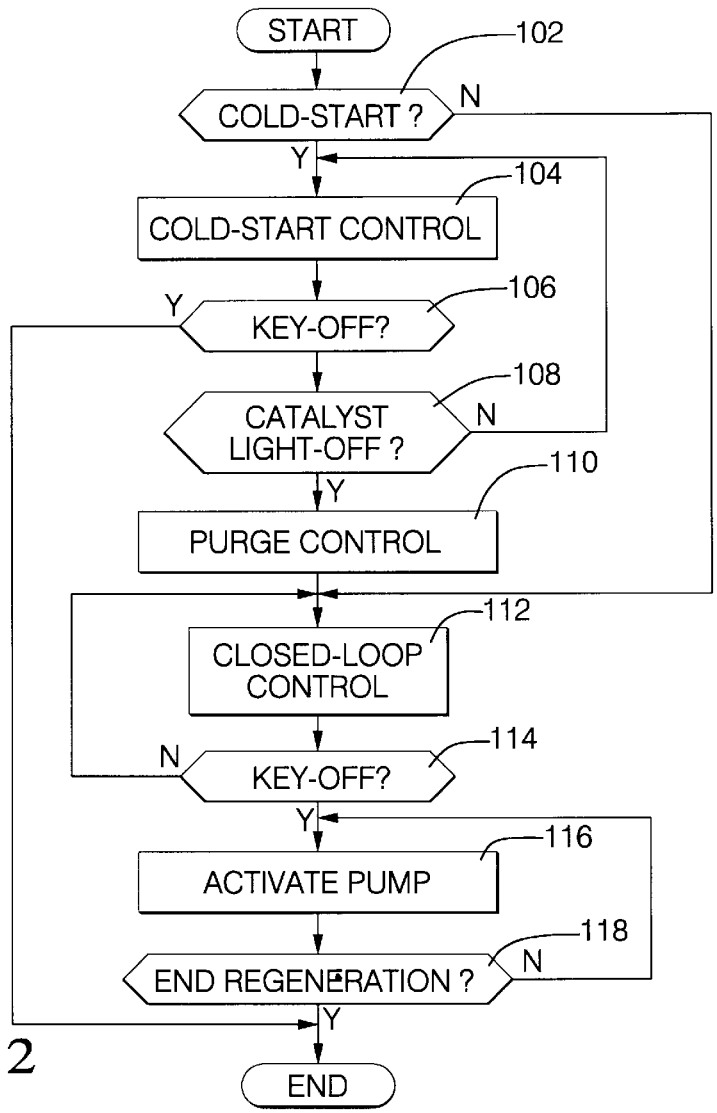
FIG. 2 illustrates a flow diagram of a computer control routine for use by controller 26 in FIG. 1.

The operation of the example system shown in FIG. 1 is preferably carried out according to the steps shown in FIG. 2. When the vehicle engine is first started, the routine moves to block 102 where it determines whether or not the engine is in a cold start condition. A cold start condition may be determined by direct temperature measurement of the catalytic converter catalyst 32. Alternatively, a cold start condition may be determined by keeping track of the time since the vehicle was last shut off after an extended operation of the vehicle. The time since last shut-off is compared to a time threshold indicative of the amount of time it takes a typical catalytic converter to cool to a temperature below light-off. If the time since last vehicle operation is less than the threshold, then it is assumed that the vehicle is not in a cold start condition and the routine moves to block 112, described further below.

In the event that a cold start condition exists, after step 102 the controller enters step 104 where it performs known open loop fuel control of the vehicle engine 14, many variations of which are known to those skilled in the art. The open loop fuel control typically lasts until the oxygen sensor 18 is at a temperature sufficiently high to provide reliable feedback to the controller. The open loop fuel control may also last for a time sufficient to guarantee smooth running of the recently started engine. After open-loop control is completed, the engine typically moves to a closed-loop fuel control mode.

During cold start operation, the catalyst of the catalytic converter 32 typically has not reached light off temperature and the catalytic converter cannot stimulate reactions of exhaust gases as desired. However, the hydrocarbon adsorber removes and stores hydrocarbons from the exhaust gases flowing out of the engine during the cold start operation, thus preventing those adsorbed hydrocarbons from exiting the vehicle through the tail pipe 38.

Step 106 checks whether or not the vehicle engine has been keyed off and if so the control routine is exited. Step 108 checks to determine whether or not the catalyst in the catalytic converter 32 is at light off temperature. If the catalytic converter catalyst is not at light off temperature, then the routine maintains the present control mode, either open loop or closed loop fuel control, depending upon engine conditions and time since engine start-up.

The determination of whether or not the catalyst has reached catalyst light-off temperature may be made a variety of ways. One example is direct temperature measurement using a thermal probe of the catalytic converter. Another method of detecting catalyst light-off is comparing a time since vehicle start up to a threshold time stored in memory, which threshold time is calibrated to represent a time value long enough that it may be assumed the catalytic converter 32 has reached light off and is performing its catalytic operations.

Once the catalyst has reached light off, the controller performs step 110, which is the purge control for the adsorber 30. The purge control for the adsorber 30 may be achieved by controlling the engine 14 in a fuel lean mode so that lean exhaust gases flow out of the engine and through passage 16 into adsorber 30, stimulating the adsorber 30 to desorb the hydrocarbons adsorbed therein. The hydrocarbons mix with the lean exhaust gas and are carried to the catalytic converter where they are reduced to more favorable exhaust gas species in a conventional manner. In addition to or in alternative to lean operation of the engine, the purge control activates air pump 24 so that air is injected out of the nozzle or outlet 20 into the exhaust path. The injected air creates a lean exhaust gas mix that flows through the adsorber to stimulate the desorption of the stored hydrocarbons and react therewith in the catalytic converter 32.

A second effect of the purge control is to achieve regeneration of the adsorber. More particularly, carbon (or coke) deposits tend to build up on the adsorber after the adsorber has reached a temperature of, for example, 200° C. These carbon deposits are burned off the now hot adsorber by reacting with the lean exhaust gases or the supplemental air provided by the air pump, thus regenerating the adsorber by eliminating the carbon deposits thereon.

After the purge control, the controller 26 performs closed loop fuel control operation at step 112 in a known manner of closed loop fuel control responsive to exhausts oxygen sensor 18. During closed loop control, step 114 monitors for key-off of the vehicle engine. If the vehicle engine is not keyed-off, the system remains in closed loop control. If the vehicle engine is keyed-off and in a state where the engine is no longer running, the controller performs step 116, which is an activation of the air pump 24 for a predetermined time period after shut-down of the engine.

The activation of air pump 24 at step 116 provides fresh air upstream of the adsorber 30. The fresh air flows through adsorber 30 and combines with carbon deposits on the still hot adsorber 30 allowing the carbon deposits to react with the fresh air and to therefore burn off of the adsorber 30. The resultant gases flow downstream of the adsorber 30 through the still hot catalytic converter, which stimulates desirable reductions in the gases while the catalyst in catalytic converter 32 is still above light-off temperature.

Step 118 checks whether or not the regeneration control is ended, for example, by the timing out of a timer set to a predetermined time period, for example three minutes, sufficient to achieve the desired regeneration. When the regeneration as ended, the control to the exhaust management system comes to an end until the next start-up of the vehicle.

Figure 3:
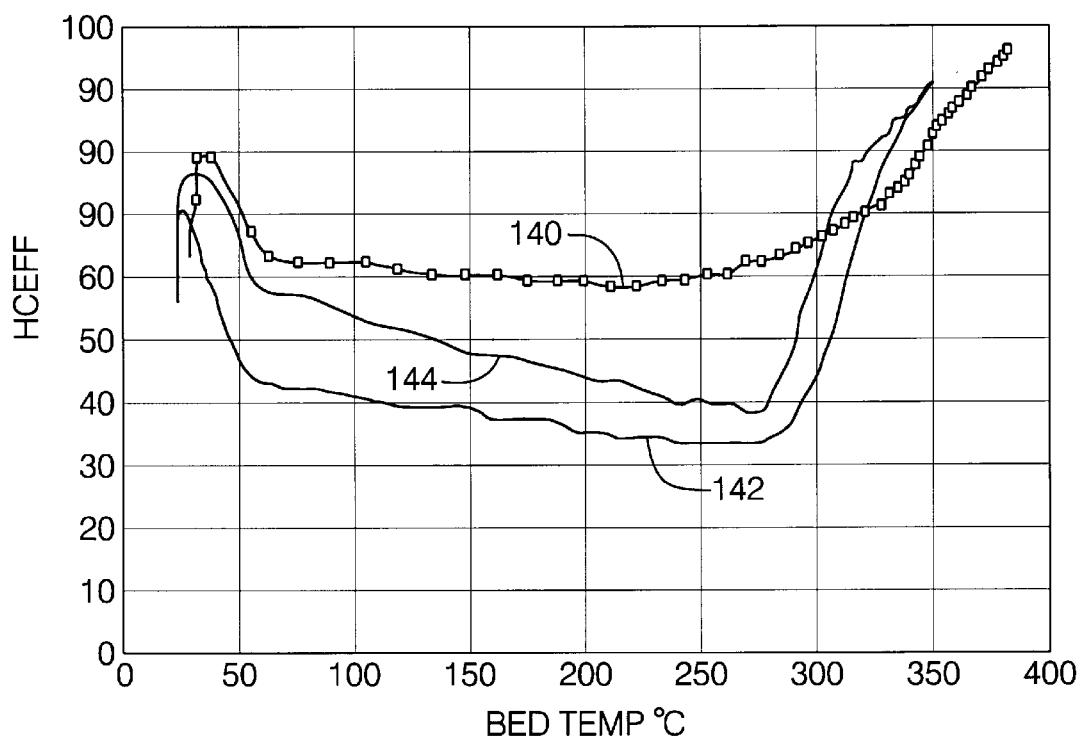
FIG. 3 illustrates advantages according to this invention.

The system and control illustrated herein provide increased efficiency in the operation of the adsorber 30 and of the exhaust management system. FIG. 3 illustrates the hydrocarbon conversion efficiency of an example adsorber and catalytic converter system during cold start of a vehicle engine. Reference 140 illustrates the performance of the example system when new. Reference 142 illustrates the performance of the system after it has been aged with one hundred cold start cycles to stimulate coke build-up. Reference 144 illustrates the performance of the system after it has been aged with one hundred cold start cycles with example control according to this invention used to regenerate the system in the manner described above. As illustrated, the example regeneration according to this invention allows superior hydrocarbon conversion efficiency by the aged system during cold start operation than achieved by the performance of the system without the regeneration according to this invention.

It will be apparent to those skilled in the art that, in the example system described herein, the controller 26 comprises means for detecting start-up of the engine, means for determining that a light-off condition of the catalytic converter has established, means for controlling a constituency of gas in the exhaust flow path following the detected light-off condition to force the gas in the flow path to be fuel-lean, wherein a first regeneration of the hydrocarbon adsorber is achieved, means for detecting an engine-off condition of the vehicle; and means for sending a control command to the air pump following the detected engine-off condition, wherein the air pump forces air through the adsorber while the adsorber is hot enough that coke deposits thereon are oxidized and thereby removed from the adsorber.

We claim:

1. An exhaust management control method comprising the steps of:
    immediately following a cold start of an engine, adsorbing hydrocarbons from an engine exhaust gas into a hydrocarbon adsorber;
    determining when a light-off of a catalytic converter in a flow path of the engine exhaust gas is obtained and thereafter purging the hydrocarbon adsorber by controlling a constituency of the engine exhaust gas to be fuel-lean, wherein the fuel-lean engine exhaust gas flows through the hydrocarbon adsorber and a first regeneration of the hydrocarbon adsorber is obtained;
    detecting an engine off condition of the vehicle; and
    injecting air through the hydrocarbon adsorber following the detected engine off condition while the vehicle remains in the engine off condition and while the hydrocarbon adsorber is hot enough that coke deposits thereon are oxidized and thereby removed from the hydrocarbon adsorber, wherein a second regeneration of the hydrocarbon adsorber is achieved.

2. An exhaust management control method comprising the steps of:
    immediately following a cold start of an engine, adsorbing hydrocarbons from an engine exhaust gas into a hydrocarbon adsorber;
    first regenerating the hydrocarbon adsorber during engine operation after a catalytic converter catalyst in a flow path of the engine exhaust gas reaches a light-off temperature by controlling a constituency of the engine exhaust gas to be fuel-lean and flowing the fuel-lean engine exhaust gas through the hydrocarbon adsorber;
    detecting an engine-off condition of the vehicle; and
    second regenerating the hydrocarbon adsorber following the detected engine-off condition by injecting air through the hydrocarbon adsorber while the vehicle remains in the engine off condition and while the hydrocarbon adsorber is hot enough that coke deposits thereon are oxidized and thereby removed from the hydrocarbon adsorber.

3. An exhaust management control system comprising:
    a vehicle internal combustion engine;
    a hydrocarbon adsorber located in a flow path of exhaust gases from the engine;
    a catalytic converter located in a flow path of exhaust gases from the engine;
    an air pump with an outlet in a flow path of the exhaust gases upstream of the hydrocarbon adsorber; and
    an electronic controller coupled to the vehicle engine and a set of sensors, wherein the electronic controller comprises:
        (a) means for detecting start-up of the engine,
        (b) means for determining that a light-off condition of the catalytic converter has established
        (c) means for controlling a constituency of gas in the exhaust flow path following the detected light-off condition to force the gas in the flow path to be fuel-lean, wherein a first regeneration of the hydrocarbon adsorber is achieved;
        (d) means for detecting an engine-off condition of the vehicle; and
        (e) means for sending a control command to the air pump following the detected engine-off condition,
    wherein the air pump forces air through the hydrocarbon adsorber while the vehicle remains in the engine-off condition and while the hydrocarbon adsorber is hot enough that coke deposits thereon are oxidized and thereby removed from the hydrocarbon adsorber, wherein a second regeneration of the hydrocarbon adsorber is achieved.

* * * * *